United States Patent Office 2,791,550
Patented May 7, 1957

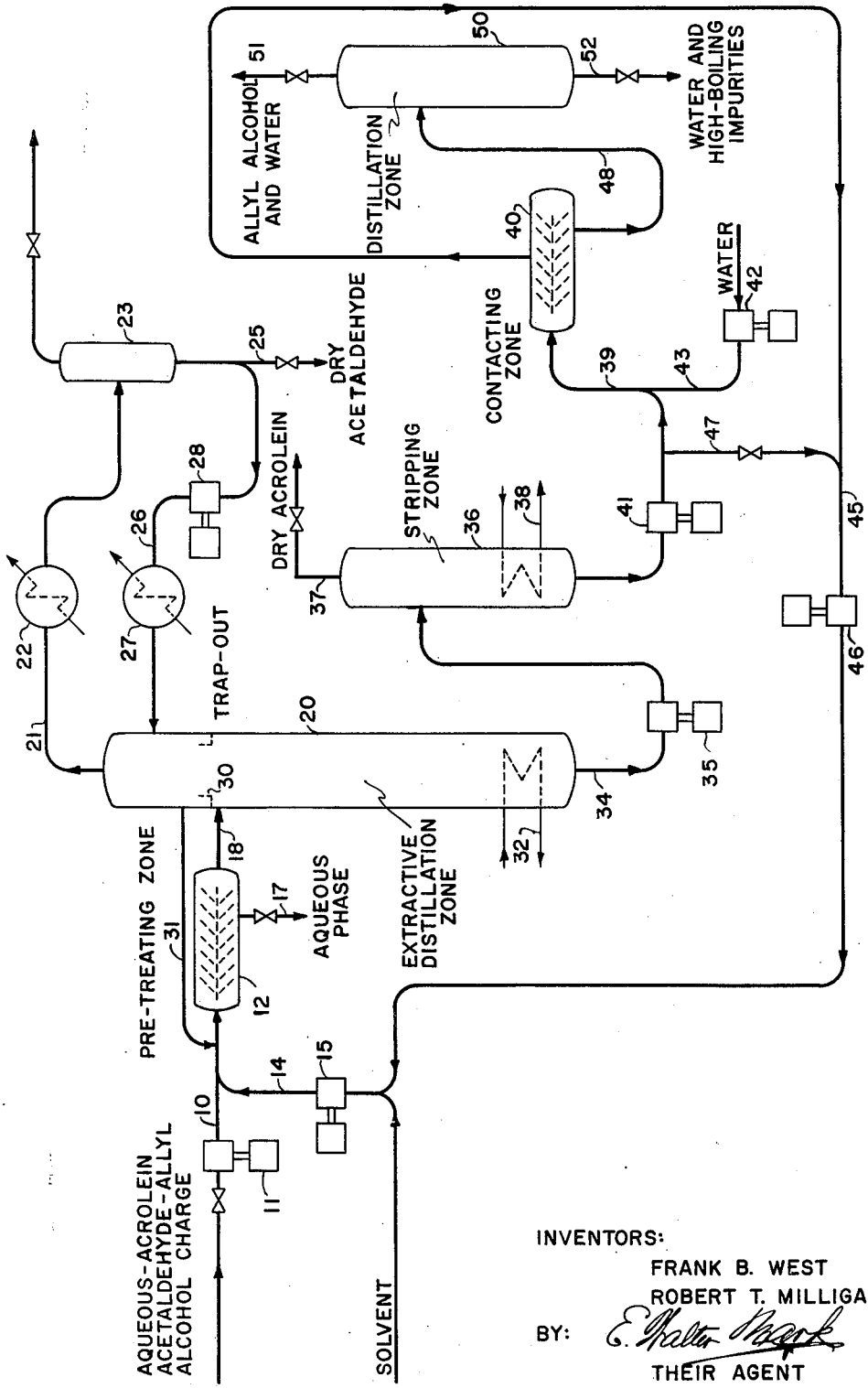

2,791,550

RESOLUTION OF AQUEOUS CARBONYL-CARBINOL MIXTURES

Frank B. West, Kensington, and Robert T. Milligan, Orinda, Calif., assignors to Shell Development Company, New York, N. Y., a corporation of Delaware Application February 24, 1955, Serial No. 490,355

15 Claims. (Cl. 202—39.5)

This invention relates to the resolution of aqueous mixtures comprising carbonylic compounds consisting essentially of acrolein and acetaldehyde in admixture with unsaturated components consisting essentially of allyl alcohol. The invention relates more particularly to the more efficient resolution of mixtures comprising acrolein, allyl alcohol, acetaldehyde and water, wherein the carbonylic components are recovered, free of any substantial amounts of water with a minimum of operative procedure.

The importance of acrolein and allyl alcohol in the chemical industry and the increased use of these materials in many fields of application has made of primary importance processes enabling their recovery from the complex mixtures in which they are often encountered in admixture with one another. Mixtures comprising acrolein and allyl alcohol in admixture with water and saturated carbonylics consisting essentially of acetaldehyde are obtained as products in processes involving the catalytic incomplete oxidation of propylene. Recently discovered improvements in such processes, as described and claimed, for example, in co-pending applications Serial No. 471,924, filed November 29, 1954, and Serial No. 478,887, filed December 30, 1954, enable the obtaining of mixtures of the above-defined character containing substantial amounts of allyl alcohol. Aqueous acrolein-allyl alcohol-acetaldehyde-containing mixtures are often produced in processes directed to the conversion of acrolein to products comprising the corresponding unsaturated alcohol, allyl alcohol, and in other chemical processes wherein allyl alcohol and acrolein are present as reactants or as reaction products. Other sources of such mixtures to the resolution of which the present invention is directed, are obtained in processes or in operations wherein these components are used as solvents, etc.

Use of these processes, or operations, on a practical scale generally necessitates recovery of at least a substantial proportion of the components of the complex mixtures produced. Often it is of primordial importance that carbonylic constituents be recovered therefrom in relatively dry state.

It is an object of the present invention to provide an improved process enabling the more efficient resolution of mixtures containing carbonylic compounds consisting essentially of acrolein and acetaldehyde in admixture with impurities consisting essentially of allyl alcohol and water.

Another object of the invention is to provide an improved process enabling the more efficient resolution of mixtures comprising acrolein, allyl alcohol, acetaldehyde and water, wherein the acrolein and acetaldehyde are separately recovered substantially free of any amount of water.

A further object of the invention is the provision of an improved process enabling the more efficient recovery of acrolein and acetaldehyde, substantially free of water, with a minimum of operative steps from mixtures comprising them in admixture with allyl alcohol and water.

A more specific object of the invention is the provision of an improved process enabling the more efficient separation of acrolein, free of any substantial amount of water, from a mixture comprising the acrolein in admixture with acetaldehyde, allyl alcohol, and water. Other objects and advantages of the invention will become apparent from the following detailed description thereof made with reference to the attached drawing wherein the single figure represents a more or less diagrammatic elevational view of one form of apparatus suitable for carrying out the process of the invention.

The mixtures comprising acrolein, allyl alcohol, acetaldehyde and water resolved in accordance with the invention may comprise the organic components in relative proportions which vary over a wide range. An advantage of the invention resides in the ability to resolve efficiently and economically on a practical scale such mixtures when they contain one or two of the organic components in only trace amounts. Thus, aqueous impure acrolein containing only exceedingly small amounts of allyl alcohol and acetaldehyde is purified economically with recovery of the allyl alcohol and acetaldehyde as separate products, in accordance with the invention.

In accordance with the process of the invention, acrolein, acetaldehyde and allyl alcohol are recovered from an aqueous mixture comprising them by bringing the feed mixture into contact with a suitable solvent in a feed pretreating zone, thereby separating an aqueous phase from an organic phase in said pretreating zone, subjecting said organic phase to partial extractive distillation in a first distillation zone under conditions forming (1) a vapor fraction comprising acetaldehyde free of any substantial amount of water, (2) an intermediate liquid fraction comprising aqueous acetaldehyde and acrolein, and (3) a liquid bottoms fraction comprising solvent, acrolein, and allyl alcohol, free of any substantial amount of water and acetaldehyde, distilling acrolein from said liquid bottoms friction (3) in a second distillation zone, contacting liquid bottoms from said second distillation zone with water in an extraction zone, thereby forming an extract phase comprising water and allyl alcohol and a raffinate phase consisting essentially of solvent, passing said intermediate liquid fraction (2) from said first distillation zone to said feed pretreating zone, and passing said raffinate phase from said extraction zone to said feed pretreating zone.

Referring to the attached drawing, a complex mixture comprising carbonylic compounds, consisting essentially of acrolein and acetaldehyde, in admixture with allyl alcohol and water obtained, for example, by the controlled catalytic incomplete oxidation of propylene-containing hydrocarbons, is passed from an outside source by means of valved line 10, provided with pump 11, into a suitable pretreating zone. The pretreating zone may comprise one or more suitable chambers, vessels, and/or coils, enabling intimate contact of the charge with the solvent employed in the process. The pretreating zone is illustrated in the drawing by a chamber 12.

A suitable solvent, such as for example, a hydrocarbon fraction having a boiling temperature in the range of from about 140° C. to about 170° C. and consisting predominantly of paraffinic hydrocarbons, is forced by means of pump 15 through line 14 into line 10 discharging into chamber 12. Although a paraffinic hydrocarbon fraction is employed in the detailed illustrative description, the invention is in no wise limited to the use of this material as the solvent. The solvent employed in the process of the invention is one capable of functioning first as a means for separating the bulk of the water from the charge in the pretreating zone, and thereafter as solvent in the subsequent partial extractive distillation of the process. Suitable solvents comprise the water-insoluble, non-polar, organic solvents which do not form azeotropes with acrolein, and preferably those which are separated therefrom under ordinary distillation conditions. Such solvents comprise, for example: the non-aromatic hydrocarbons having a boiling temperature of at least about 125° C. including the paraffins, cycloparaffins, olefins, such as, the octanes, nonanes, decanes, dimethylcyclohexanes, propylcyclopentanes, butylcyclohexanes, their corresponding olefins, higher homologues, etc.; the aromatic hydrocarbons having a boiling temperature of at least about 110° C., such as toluene, ethyl benzene, the xylenes, the propyl benzenes, and higher homologues thereof; hydrocarbon mixtures of fractions comprising two or more of the foregoing hydrocarbons; the normally liquid high molecular alcohols, ethers, etc.; particularly preferred solvents comprise hydrocarbon fractions consisting predominantly of paraffins and/or napthenes having a boiling range of from about 140 to about 170° C., and an aromatic hydrocarbon fraction consisting essentially of mixed xylenes.

The amount of solvent employed may vary widely within the scope of the invention. It has been found that generally the introduction of solvent at a rate maintaining the mole ratio of solvent to organic components introduced into chamber 12 in the range of from about 0.2:1 to about 5:1, and preferably from about 0.4:1 to about 1:1 are satisfactory. The specific amount preferably employed will generally vary to some extent in accordance with specific compositions of the charge and conditions employed in the pretreating and subsequent distillation zone. Within chamber 12 at least a substantial part of the contents are maintained in the liquid phase at a temperature ranging, for example, from about 0° C. to about 100° C., and preferably from about 30° C. to about 70° C. Contents of chamber 12 may be maintained under atmospheric or superatmospheric pressure. Conventional means, not shown in the drawing, are provided for the maintenance of contents of chamber 12 within the desired range of temperature and pressure.

Under the above-defined conditions, there is separated in chamber 12 an aqueous phase consisting essentially of water containing water-soluble impurities originally present in the charge to the system. Allyl alcohol, though normally soluble in water, will not be present in any substantial amount in the aqueous layer because of greater solubility in the acrolein-hydrocarbon phase. In addition to the solvent, the organic phase formed in chamber 12 will comprise acrolein, allyl alcohol, and a residual amount of water. The aqueous phase is withdrawn from chamber 12 by means of valve line 17 and eliminated from the system. The organic phase is passed from chamber 12, through line 18, into a suitable first distillation zone. The first distillation zone may comprise one or more stills, columns, and the like, enabling the subjection therein of the charge emanating thereto through line 18, to distillation conditions comprising a partial extractive distillation. Thus, the suitable first distillation zone may comprise, for example, a column 20. Within column 20 the charge emanating thereto through line 18 is subjected to distillation conditions comprising partial extractive distillation conditions resulting in the formation of (1) an overhead fraction consisting essentially of acetaldehyde and any lower boiling materials originally present in the charge, including normally gaseous materials, and containing no substantial amount of water, (2) an intermediate fraction consisting essentially of acrolein, acetaldehyde, and water, and (3) a liquid bottoms fraction consisting essentially of hydrocarbon solvent, acrolein, allyl alcohol, and higher boiling impurities. Essential to the obtaining of the desired separation within column 20, resulting in the formation of both an anhydrous overhead and anhydrous bottoms, is the maintenance of conditions enabling partial extractive distillation therein. These conditions are obtained by the introduction of the charge into the tower at an intermediate point thereof and avoiding the presence of any substantial amount of the solvent in the column above such intermediate point of introduction of the charge. The partial extractive distillation conditions leading to the formation of the dry acetaldehyde overhead and dry bottoms comprising solvent acrolein, solvent, and allyl alcohol, are not obtained under the conditions prevailing in a true extractive distillation wherein the solvent must be introduced into the column at a point above that at which the charge is introduced.

The overhead fraction is removed from column 20 and passed through line 21, provided with cooler 22, into accumulator 23. Liquid free of any substantial amount of water comprising acetaldehyde is drawn from acccumulator 23 through valve line 25. Part of the acetaldehyde-containing liquid thus drawn from accumulator 23 through valve line 25 is forced through line 26, provided with cooler 27; by means of pump 28, into the top of column 20. Sufficient liquid is thus introduced into the top of column 20 through line 26 to assure the formation of the intermediate liquid fraction consisting essentially of aqueous acrolein within column 20. A trap-out tray 30, or similar suitable means, is provided within column 20 at an intermediate part thereof, above the point at which feed line 31 enters the column 20, to enable accumulation therein of an aqueous intermediate fraction comprising acrolein, acetaldehyde, and substantially all water introduced into the column. The aqueous intermediate fraction is withdrawn from the trap-out section 30 in column 20 and passed through line 31 into line 10 discharging into chamber 12. Acrolein and acetaldehyde thus passed in the aqueous stream through line 31 to accumulator will be returned in the organic phase to the column 20 for ultimate substantially complete recovery. Judicious control of the rate of withdrawal of aqueous acrolein from the intermediate section of the column 20 enables the formation of liquid bottoms consisting essentially of hydrocarbon solvent containing allyl alcohol and acrolein free of any substantial amount of water and acetaldehyde. Suitable means enabling the maintenance of desired distillation conditions within column 20, such as for example, a reboiler, or closed heating coil 32 in the lower part thereof, are provided.

The liquid bottoms are passed from column 20 through valve line 34 provided with pump 35 into a second distillation zone comprising, for example, a suitable distillation column 36. Within column 36 the charge emanating from the lower part of column 20 is subjected to fractional distillation resulting in the formation of a vapor overhead consisting essentially of acrolein free of any substantial amount of water, and a liquid bottoms fraction consisting essentially of solvent, allyl alcohol, and higher boiling impurities. The vapor fraction consisting essentially of acrolein is removed from column 36 by means of line 37 and eliminated from the system as a final product. Column 36 is provided with suitable means, such as for example, reboilers and/or closed heating coil 38 to enable the maintenance of the desired distillation conditions therein. Also provided are means enabling the condensation of distillation overhead and for return of reflux to the column 36.

The liquid bottoms are passed from column 36 through line 39 into suitable allyl alcohol separating means, for example, an extraction zone. Such an extraction zone may comprise, for example, a contacting chamber 40. A valve line 47 is provided to enable the passage of at least a part of the liquid bottoms emanating from column 36 through line 41 into line 45, should this be desired. Water emanating from an outside source is forced by means of pump 42, through line 43, into line 39 discharging into chamber 40. Contents of chamber 40 are maintained in the liquid phase at a temperature in the range of, for example, from about 0° C. to above about 160° C., preferably from about 30° C. to about 70° C. Within chamber 40 there is separated an aqueous phase comprising in addition to water, allyl alcohol and higher boiling water-soluble impurities originally present in the charge or formed during the course of the process, from an organic phase consisting essentially of the hydrocarbon solvent introduced into the system through line 14. The hydrocarbon solvent is passed from chamber 40 through line 45, provided with pump 46, into line 14 discharging into line 10. The aqueous phase is passed from chamber 40 through line 48 into a third distillation zone comprising, for example, fractionating column 50.

An advantage of the process resides in the extreme flexibility of operating conditions within the allyl alcohol extraction zone without loss of allyl alcohol or substantial decreases in efficiency. Thus the inclusion of a substantial part of allyl alcohol in the hydrocarbon phase recycled through line 45 may be carried out within the scope of the invention. Such recycled allyl alcohol will again pass through the system to ultimate recovery in distillation column 50.

Within column 50 allyl alcohol is distilled overhead as the water azeotrope and eliminated from the column through line 51 as a final product. Liquid bottoms remaining in column 50 consisting essentially of water and high boiling impurties originally present in the charge as formed within the system, are eliminated therefrom through valve line 52.

*Example*

In a continuous operation, a mixture, containing approximately 66.5 mole percent acrolein, 13.0 mole percent acetaldehyde, and 3.0 mole percent allyl alcohol, the balance being water containing a minor amount of water-soluble organic impurities such as acetone and propionaldehyde, obtained by the controlled catalytic incomplete oxidation of propylene, is mixed with a hydrocarbon solvent consisting essentially of a low boiling naphtha cut boiling in the range of from 150° C. to 160° C. The hydrocarbon solvent is added to the charge material at a rate to result in a mixture containing approximately a mole ratio of solvent to organic components in the charge of 0.5:1. The resulting mixture is introduced into a pretreating chamber maintained at a temperature of about 60° C., thereby forming an aqueous phase and an organic phase, the organic phase containing substantially all of the hydrocarbon solvent, acrolein, acetaldehyde and allyl alcohol. The aqueous phase is withdrawn from the pretreating chamber and eliminated from the system. The hydrocarbon phase is subjected to partial extractive distillation in a first distillation column. The first distillation column is provided with an intermediate trap-out tray and liquid draw-off positioned above the point of feed introduction. Acetaldehyde, free of water, is distilled overhead from the first distillation column and condensed. An intermediate aqueous liquid fraction consisting essentially of water, acrolein, and acetaldehyde and containing 66 mole percent acrolein, and 20 mole percent acetaldehyde, the balance consisting essentially of water, is continuously withdrawn from the trap-out tray positioned above the point of feed introduction in the first distillation column and passed to the pretreating chamber. Acetaldehyde condensate is returned to the upper part of the first distillation column in an amount sufficient to maintain a reflux ratio rate of 12 moles/mole of acetaldehyde product. Under these conditions continuous formation of the intermediate liquid fraction consisting of water, acrolein, and acetaldehyde at the intermediate point of the first distillation column takes place with the maintenance of desired partial extractive distillation conditions in the column below the point of withdrawal of the intermediate liquid fraction. Continuous withdrawal of the intermediate liquid fraction from the first distillation column at a point above feed introduction into the column, its continuous passage to the pretreating chamber, and the maintenance of the partial extractive distillation conditions below the point of withdrawal of the intermediate liquid fraction in the column, results in the formation of liquid bottoms containing no substantial amount of water and acetaldehyde and consisting essentially of hydrocarbon solvent, acrolein, and allyl alcohol. The acetaldehyde obtained as overhead in the first distillation column contains 0.1 to 0.2% acrolein and water; the balance consisting essentially of acetaldehyde. The liquid bottoms from the first distillation are distilled in a second distillation column. In the second distillation column, acrolein containing less than 0.1 mole percent each of water, acetaldehyde, and allyl alcohol, is taken overhead. Liquid bottoms formed in the second distillation column, consisting essentially of hydrocarbon solvent and allyl alcohol, are admixed with an amount of water in the amount of one volume of water per twenty volumes of solvent. The resulting mixture is introduced into a chamber and allowed to stratify. An aqueous phase containing about 40% of the allyl alcohol introduced into the chamber is separated from an organic phase consisting essentially of the hydrocarbon solvent containing the balance of the allyl alcohol in the contacting chamber. The hydrocarbon phase is returned continuously from the contacting chamber to the pretreating chamber. Allyl alcohol is distilled from the aqueous phase as the water azeotrope in a third distillation column. The allyl alcohol-water azeotrope thus obtained contains 40 mole percent allyl alcohol. Allyl alcohol recycled in the hydrocarbon phase is passed through the system resulting in ultimate recovery of substantially all allyl alcohol charged to the system.

In practicing the method of resolving the complex mixtures, in accordance with the invention, suitable modifications with respect to apparatus employed may be made as apparent to one skilled in the art without departing from the spirit of the invention. The pretreating zone, the separate distillation zones, and the extraction zone depicted in the drawing by single pieces of apparatus may comprise the use of one or more pieces of apparatus directed to the execution of the above-defined process steps therein. For the purpose of clarity, parts of apparatus, such as for example, pumps, coolers, reboilers, condensers, valves, etc., not essential to a complete understanding of the invention have been omitted from the drawing.

We claim as our invention:

1. The process for resolving a mixture containing carbonylic compounds consisting essentially of acrolein and acetaldehyde in admixture with allyl alcohol and water, which comprises bringing said mixture into contact with a water-insoluble, non-polar, organic solvent, which solvent forms non-azeotropic mixtures with acrolein and is separable therefrom by fractional distillation in a feed pretreating zone, thereby forming an aqueous phase and an organic phase consisting essentially of acrolein, acetaldehyde, allyl alcohol, and a residual amount of water in said pretreating zone, separating said organic phase from said aqueous phase, subjecting said organic phase to partial extractive distillation conditions in a first distillation zone, separating (1) a vapor fraction comprising acetaldehyde free of any substantial amount of water, (2) an intermediate liquid fraction comprising water, acetaldehyde, and acrolein, and (3) a liquid bottoms fraction comprising said solvent, acrolein, and allyl alcohol free of any substantial amount of water in said first distillation zone, passing said intermediate liquid fraction from said first distillation zone to said pretreating zone, and distilling acrolein from said liquid bottoms fraction.

2. The process in accordance with claim 1 wherein said solvent is a paraffinic hydrocarbon solvent having a minimum boiling temperature of about 125° C.

3. The process in accordance with claim 1 wherein said solvent is a paraffinic hydrocarbon fraction having a boiling range of from about 140° C. to about 170° C.

4. The process in accordance with claim 1 wherein said solvent is an aromatic hydrocarbon solvent having a minimum boiling temperature of about 110° C.

5. The process in accordance with claim 4 wherein said aromatic hydrocarbon solvent is xylene.

6. The process for resolving a mixture containing carbonylic compounds consisting essentially of acrolein and acetaldehyde in admixture with allyl alcohol and water, which comprises bringing said mixture into contact with a water-insoluble, non-polar, organic solvent, which solvent forms non-azeotropic mixtures with acrolein and is separable therefrom by fractional distillation in a feed pretreating zone, thereby forming an aqueous phase and an organic phase consisting essentially of acrolein, acetaldehyde, allyl alcohol, and a residual amount of water in said pretreating zone, separating said organic phase from said aqueous phase, subjecting said organic phase to partial extractive distillation conditions in a first distillation zone, separating (1) a vapor fraction comprising acetaldehyde free of any substantial amount of water, (2) an intermediate liquid fraction comprising water, acetaldehyde, and acrolein, and (3) a liquid bottoms fraction comprising said solvent, acrolein and allyl alcohol free of any substantial amount of water in said first distillation zone, passing said intermediate liquid fraction from said first distillation zone to said pretreating zone, passing said liquid bottoms fraction from said first distillation zone into a second distillation zone, separating a vapor fraction comprising acrolein from a liquid bottoms fraction comprising said solvent and allyl alcohol in said second distillation zone, and passing at least a part of said liquid bottoms from said second distillation zone into said pretreating zone.

7. The process in accordance with claim 6 wherein said solvent is a paraffinic hydrocarbon solvent having a minimum boiling temperature of about 125° C.

8. The process in accordance with claim 6 wherein said solvent is a hydrocarbon fraction boiling in the range of from about 140° C. to about 170° C.

9. The process in accordance with claim 6 wherein said solvent is an aromatic hydrocarbon solvent having a minimum boiling temperature of about 110° C.

10. The process in accordance with claim 9 wherein said solvent is xylene.

11. The process for resolving a mixture containing carbonylic compounds consisting essentially of acrolein and acetaldehyde in admixture with allyl alcohol and water, which comprises bringing said mixture into contact with a water-insoluble, non-polar, organic solvent consisting essentially of normally liquid hydrocarbons having a minimum boiling temperature of about 110° C. in a feed pretreating zone, thereby forming an aqueous phase and an organic phase consisting essentially of acrolein, acetaldehyde, allyl alcohol, and a residual amount of water in said pretreating zone, separating said organic phase from said aqueous phase, subjecting said organic phase to partial extractive distillation conditions in a first distillation zone, separating (1) a vapor fraction comprising acetaldehyde free of any substantial amount of water, (2) an intermediate liquid fraction consisting essentially of water, acetaldehyde, and acrolein, and (3) a liquid bottoms fraction comprising solvent, acrolein, and allyl alcohol free of any substantial amount of water in said first distillation zone, passing said intermediate liquid fraction from said first distillation zone to said pretreating zone, passing said liquid bottoms fraction from said first distillation zone into a second distillation zone, separating vapors consisting essentially of acrolein from a liquid bottoms fraction comprising solvent and allyl alcohol in said second distillation zone, contacting said liquid bottoms fraction separated in said second distillation zone with water, thereby forming an extract phase comprising aqueous allyl alcohol and a raffinate phase comprising hydrocarbon solvent.

12. The process in accordance with claim 11 wherein said solvent is a paraffinic hydrocarbon solvent having a minimum boiling temperature of about 125° C.

13. The process in accordance with claim 11 wherein said solvent is a hydrocarbon fraction boiling in the range of from about 140° C. to about 170° C.

14. The process in accordance with claim 11 wherein said solvent is an aromatic hydrocarbon solvent having a minimum boiling temperature of about 110° C.

15. The process in accordance with claim 14 wherein said solvent is xylene.

References Cited in the file of this patent

UNITED STATES PATENTS

| | | |
|---|---|---|
| 2,514,966 | Pierotti et al. | July 11, 1950 |
| 2,514,967 | Pierotti et al. | July 11, 1950 |
| 2,542,752 | Cole | Feb. 20, 1951 |
| 2,582,214 | Twigg | Jan. 8, 1952 |
| 2,610,141 | Drout | Sept. 9, 1952 |
| 2,707,716 | Price | May 3, 1955 |